July 18, 1950 — T. K. SHERWOOD — 2,515,319
AIR CONDITIONING
Filed Nov. 22, 1946 — 2 Sheets-Sheet 2
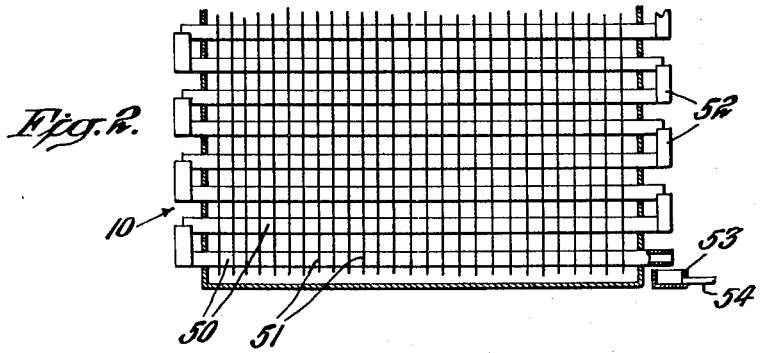
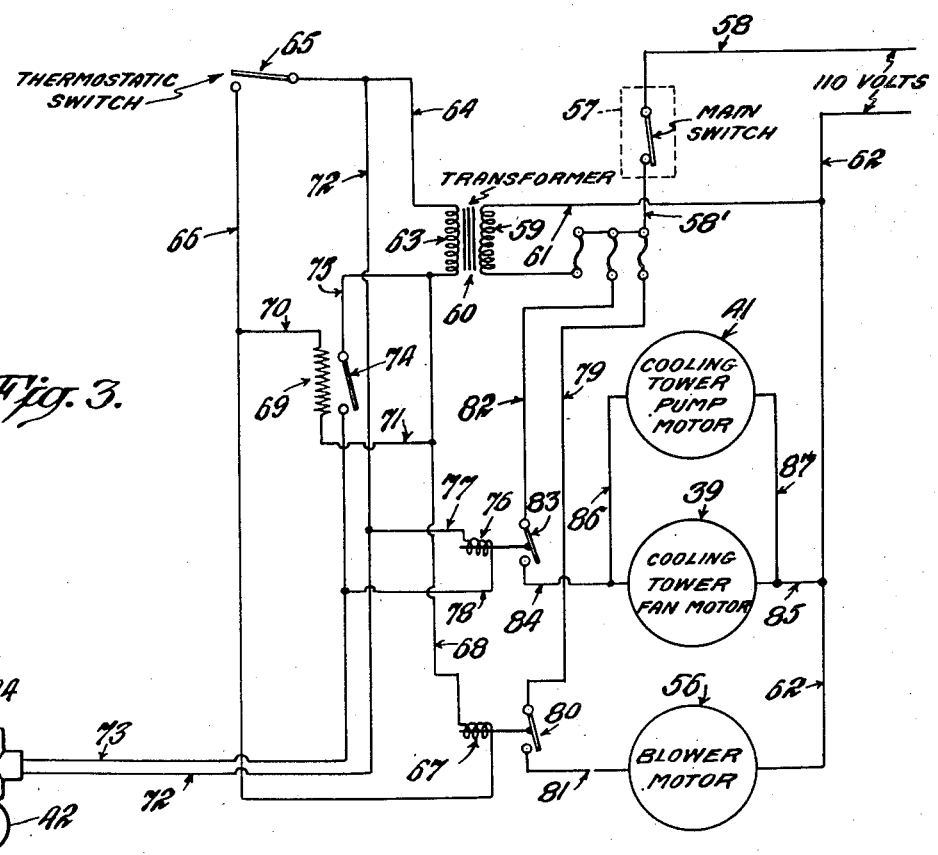
INVENTOR.
Thomas K. Sherwood
BY
J. L. Kelly
ATTORNEY Patented July 18, 1950

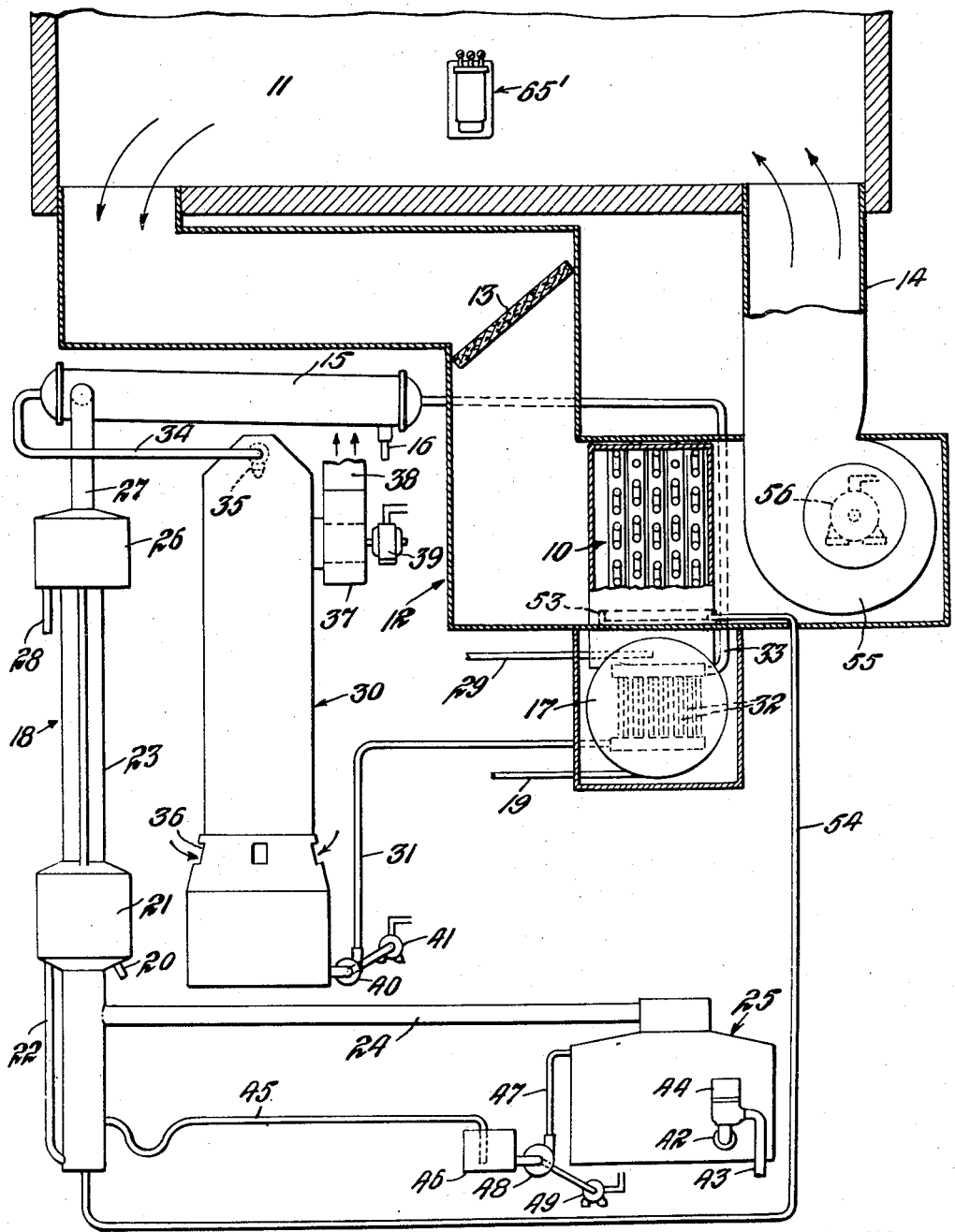

2,515,319

UNITED STATES PATENT OFFICE 2,515,319

AIR CONDITIONING

Thomas K. Sherwood, Wellesley Hills, Mass., assignor to Servel, Inc., New York, N. Y., a corporation of Delaware Application November 22, 1946, Serial No. 711,703

8 Claims. (Cl. 62—5)

This invention relates to air cooling with an absorption refrigerating apparatus and more particularly to reducing superheating of refrigerant-absorbent solution in the generator of such apparatus.

In the operation of certain types of absorption refrigerating apparatus, particularly low pressure or vacuum types, it has been found that under certain conditions of operation excessive superheating resulting in noisy boiling of the solution may occur in the generator on starting the apparatus. It has been found in practice that by diluting the solution in the generator, as by providing a return line for conveying liquid refrigerant from the evaporator to the generator, that superheating may be greatly reduced. With this arrangement when the apparatus is shut down the liquid refrigerant remaining in the evaporator drains directly to the bottom of the generator, diluting the solution therein, so that when the apparatus is later started up the solution boils more readily whereby superheating and its ensuing noise is reduced. This arrangement for diluting the solution in the bottom of the generator following a shut-down operates very satisfactorily provided liquid refrigerant is supplied to substantially all of the evaporator tubes immediately prior to the shut-down. However, should the unit operate for a period of time on half heat input, for instance, before being shut down, the lower tubes of the evaporator become dry and warm, so that liquid refrigerant draining from the upper to the lower tubes following a shut down is vaporized in the lower tubes and little or no liquid refrigerant reaches the bottom of the evaporator, so that substantially no liquid refrigerant is delivered to the bottom of the generator as desired.

It is therefore an object of this invention to provide means whereby it is assured that diluted refrigerant-absorbent solution will be present in the bottom of the generator of an absorption refrigerating apparatus following each shut-down of the apparatus.

Although various means may be utilized to accomplish the above object, I choose to use a control arrangement whereby at the beginning of a shut-down period the refrigerating apparatus continues to supply liquid refrigerant to the evaporator or cooling element for a short period of time after the circulation of air over the evaporator has been stopped. With this arrangement, since air to be cooled is no longer circulated over the evaporator, the liquid refrigerant that is supplied to the evaporator passes therethrough without appreciable vaporization, which liquid is collected at the lower part of the evaporator and conveyed to the bottom of the generator, thereby diluting the refrigerant-absorbent solution in the generator following each shutdown period.

The invention together with its objects and advantages is set forth in more technical detail in the following description and accompanying drawings, wherein:

Fig. 1 is a view diagrammatically illustrating an air conditioning system incorporating this invention;

Fig. 2 is an elevational view, partly in section, showing an air cooling element and drip trough; and Fig. 3 is a view diagrammatically illustrating my improved electric circuits and controls, for controlling the operation of the air conditioning system illustrated in Fig. 1.

Referring to Fig. 1, the air cooling system includes an evaporator or cooling element 10 arranged in a duct system through which air is drawn from an enclosure 11 and after being cooled is returned to the enclosure. The duct system includes a duct 12 through which air is withdrawn from the enclosure and in which is disposed a filter 13 and the cooling element 10. Air is drawn through duct 12 by a blower 55 from which air is discharged through a duct 14 to the enclosure. The blower is operated by an electric motor 56.

The cooling element 10 forms part of a refrigerating apparatus of the two pressure absorption type and may be of the type disclosed in U. S. Patent No. 2,282,503, to A. R. Thomas and P. P. Anderson, Jr. In an apparatus of this type liquid refrigerant, such as, for example, water, is introduced into the upper part of the evaporator or cooling element 10 from a condenser 15 through a path of flow including a conduit 16 and a flash chamber, not shown. The liquid refrigerant vaporizes in cooling element 10 with consequent absorption of heat to produce a refrigerating or cooling effect to cool air drawn through duct 12, as explained above. The refrigerant vapor formed in cooling element 10 flows therefrom to an absorber 17 in which the vapor is absorbed into a liquid absorbent, such as, for example, a lithium chloride or lithium bromide solution. The absorption liquid enriched in refrigerant is conducted from absorber 17 to a generator 18 in a path of flow including a conduit 19, a first passage of a liquid heat exchanger, not shown, a conduit 20, an annular stabilizing vessel 21 and a conduit 22 into the bottom of the generator.

Within the generator are disposed a plurality of riser tubes enveloped by a chamber formed by an outer shell 23 to which steam is supplied through a conduit 24 from a boiler 25. The heating of the riser tubes by the steam causes refrigerant vapor to be expelled from the absorption solution, the expelled vapor being effective to raise absorption solution by gas or vapor-lift action. The expelled vapor passes through the upper ends of the riser tubes into a vapor separator 26 and thence flows through a conduit 27 to condenser 15 in which the vapor is liquefied. The liquid refrigerant formed in the condenser flows through conduit 16 to the upper part of cooling element 10, as explained above, to complete the refrigerating cycle. The concentrated absorption solution from which refrigerant vapor has been expelled is conducted from the upper part of generator 18 to absorber 17 through a path of flow including a conduit 28, a second passage of the liquid heat exchanger and conduit 29 into the top of the absorber.

The disclosure in the aforementioned Thomas and Anderson patent may be considered as being incorporated in this application, and, if desired, reference may be made thereto for a detailed description of the refrigerating apparatus.

The condenser 15 and absorber 17 constitute heat rejecting parts of the refrigerating apparatus and are cooled by a suitable cooling medium such as, for example, water, which is continuously circulated in a closed circuit through a spray-type cooling tower 30. The cooled water is conducted through a conduit 31 into and through banks of tubes 32 within the absorber, whereby heat, resulting from absorption of refrigerant vapor by liquid absorbent, is given up to the cooling water. The water is conducted from the absorber through a conduit 33 to the condenser in which heat of condensation, resulting from condensation of refrigerant vapor, is given up to the cooling water.

The cooling water flows from the condenser through a conduit 34 to spray nozzles disposed in the upper part of the cooling tower, one of which nozzles is indicated at 35. The water passing downward in tower 30 flows in intimate contact with an upwardly flowing stream of air which is drawn through inlets 36 by a fan 37, and exhausted or discharged from the upper part of the cooling tower at an outlet 38. The fan 37 is arranged to be driven by an electric motor indicated at 39. The water, which is cooled by partial evaporation into the upwardly flowing air stream in tower 30, collects in a sump at the bottom of the tower and is conducted therefrom through conduit 31 to the absorber by a pump 40 operated by an electric motor 41.

The steam boiler 25 is arranged to be heated by a burner 42 with the flame produced thereby adapted to pass into a flue which is in communication with a heating tube disposed within the boiler. A combustible gas delivered to the burner through a conduit 43 from a suitable source of supply, the flow of gas to the burner being controlled by an electrically-operated solenoid valve 44. The condensate formed in the steam chamber of generator 18 flows by gravity through a conduit 45 to a condensate collection vessel 46. From vessel 46 the condensate is returned through a conduit 47 to the steam boiler by a pump 48 operated by an electric motor 49.

As shown in Fig. 2 of the drawing, the evaporator or cooling element 10 includes a plurality of rows of horizontal tubes 50 arranged in vertical spaced relation and provided with heat transfer fins 51. Each of the tubes 50 is provided at one end with a cup 52 which receives liquid refrigerant from the tube above. A drain trough 53, connected to the bottom of the generator 18 by a conduit 54, is located immediately below the ends of the lowermost row of tubes 50. The arrangement is such that liquid refrigerant flows from the condenser through conduit 16 into a flash chamber, not shown. From the flash chamber the liquid refrigerant flows into the uppermost row of tubes 50, through these tubes, into the cups at the end of the next lower row of tubes and so on through the remaining tubes in series. The refrigerant vapor formed in the evaporator tubes flows from the ends thereof into headers, not shown, at each end of the evaporator, and from there the vapor flows into the absorber. Any liquid refrigerant that is not vaporized in the lowermost row of tubes flows from the outlet ends thereof into drain trough 53, and from there the liquid refrigerant flows through conduit 54 into the bottom of generator 18.

Referring now to Fig. 3 of the drawing wherein my improved delayed action control is diagrammatically illustrated, 57 designates a manually operated main switch which is connected on one side to a source of alternating current by a conductor 58 and on the other side this switch is connected by a conductor 58' to one terminal of the primary winding 59 of a step-down transformer 60. The opposite terminal of the primary winding is connected to the source of alternating current by conductors 61 and 62. One terminal of the secondary or low voltage winding 63 of the transformer is connected by a conductor 64 to one terminal of a thermostatic switch 65. This thermostatic switch, which is contained in a room thermostat diagrammatically illustrated at 65' in Fig. 1, may be of any suitable type. However, it is preferred to use a thermostatic switch which opens and closes the low voltage circuit in accordance with the temperature of the enclosure that is being conditioned. Such a switch is illustrated and described in Patent No. 2,381,427 to Sven W. E. Andersson. and, if desired, reference may be had to this patent for a detailed description of this switch. The opposite terminal of thermostatic switch 65 is connected by a conductor 66 to one side of a relay 67, and the opposite side of this relay is connected by a conductor 68 to the second terminal of the low voltage winding 63 of the transformer. Thus, a first low voltage circuit includes the secondary winding 63 of the transformer, conductor 64, thermostatic switch 65, conductor 66, relay 67 and conductor 68. An electric heating coil 69 is connected across this first low voltage circuit by conductors 70 and 71.

A second low voltage circuit includes the secondary winding 63 of the transformer, conductor 64, a conductor 72, solenoid 44, a conductor 73, a thermostatic switch 74 and a conductor 75. A relay 76 is connected across this second low voltage circuit by conductors 77 and 78. Thermostatic switch 74 includes a bi-metal element that is arranged to be heated by heating coil 69 to close the switch when the heating element is energized. The bi-metal element has a given heat capacity, so that switch 74 remains closed for a given period of time after the heating coil 69 has been deenergized.

Referring still to Fig. 3, a conductor 79, a switch 80 operated by relay 67 and a conductor 81 connect one side of the blower motor 56 to high voltage conductor 58', the opposite side of which motor is connected directly to conductor 62 of the high voltage circuit. A conductor 82, a switch 83 operated by relay 76 and a conductor 84 connects one side of cooling tower fan motor 39 to high voltage conductor 58' and the opposite side of the fan motor is connected by a conductor 85 to conductor 62 of the high voltage circuit. As shown, cooling tower pump motor 41 is connected in parallel with fan motor 39 by conductors 86 and 87.

Assuming that the enclosure 11 is above the desired temperature and that main switch 57 is closed, thermostatic switch 65 closes the circuit in the first low voltage circuit and low voltage current flows from secondary winding 63 of the transformer through conductor 64, thermostatic switch 65, conductor 66, relay 67 and conductor 68 thereby energizing relay 67. The energization of relay 67 causes switch 80 to be closed thereby energizing the blower motor 56. With thermostatic switch 65 closed, low voltage current flows also through conductor 70, heating coil 69 and conductor 71 whereby the heating coil is energized which in turn heats the bi-metal element of switch 74 causing this switch to close the second low voltage circuit. The closing of the second low voltage circuit energizes the solenoid 44 of the gas burner control whereby fuel gas is supplied to the gas burner 43 of the steam boiler which in turn supplies steam to the generator 18 causing refrigerant vapor to be expelled from solution, which vapor is liquefied in the condenser and the liquid is vaporized in the evaporator producing the desired cooling effect, as explained above. The closing of the second low voltage circuit also energizes the relay 76 which closes switch 83 whereby the cooling tower fan motor 39 and pump motor 41 are energized and cooling water is supplied to the absorber and condenser.

Assume now that the enclosure 11 has reached the desired low temperature and that thermostatic switch 65 opens the first low voltage circuit, relay 67 is deenergized and switch 80 is opened, which in turn denergizes blower motor 56. The opening of the first low voltage circuit also deenergizes the heating coil 69 so that the bi-metal element of switch 74 is no longer heated by this coil. However, as explained above, the bi-metal element has sufficient heat capacity so that switch 74 in the second low voltage circuit remains closed for a given period of time after switch 65 in the first low voltage circuit has been opened. By providing a suitable heat capacity in the form of a block of metal, for instance, associated with the bi-metal element, any desired interval of time may be provided between the cessation of current in the first low voltage circuit and the opening of switch 74 in the second low voltage circuit.

At the beginning of a shut-down period, with switch 65 open and switch 74 closed, refrigerant vapor will continue to be expelled from solution in the generator, liquefied in the condenser and the liquid refrigerant will be conveyed to the evaporator, as before. However, since the blower is now idle, most of the liquid refrigerant supplied to the evaporator will pass therethrough as liquid and be caught in the drain trough 53. Also, when switch 74 finally opens the second low voltage circuit and deenergizes solenoid 44 and relay 76 thereby stopping the refrigerating cycle, any liquid refrigerant that remains in the tubes of the evaporator will flow downward therethrough into trough 53. From the trough the liquid refrigerant is conveyed through conduit 54 into the bottom of the generator. In this manner it is assured that the solution in the bottom of the generator will be diluted after each shut-down so that when the unit is again started up the solution will boil more readily, without superheating and without noise.

Having thus disclosed my invention, I wish it to be understood that I do not desire to be limited to the exact details of construction shown and described, for obvious modifications will occur to a person skilled in the art.

What is claimed is:

1. A refrigerating apparatus comprising a generator, a condenser, an evaporator, an absorber, conduits interconnecting said elements for flow of a refrigerating medium and an absorption solution, a first means for heating said generator, a second means for cooling said condenser and absorber, a third means for flowing a medium to be cooled in heat exchange relation with said evaporator, and means for controlling the operation of said first and third means, said control means including mechanism for discontinuing the operation of said third means while continuing the operation of said first means for a short period of time, whereby liquid refrigerant supplied to the evaporator after the operation of the third means has been discontinued flows therefrom as liquid refrigerant, and means for conveying said liquid refrigerant as such from the evaporator to the bottom of the generator.

2. A refrigerating apparatus comprising a generator, a condenser, an evaporator, an absorber, conduits interconnecting said elements for flow of a refrigerating medium and an absorption solution, a first means for heating said generator, a second means for cooling said condenser and absorber, a third means for flowing a medium to be cooled over said evaporator, and means for controlling the operation of said first, second and third means, said control means including mechanism for discontinuing the operation of said third means while continuing the operation of said first and second means for a short period of time, whereby liquid refrigerant supplied to the evaporator after the operation of the third means has been discontinued flows therefrom as liquid, and means for conveying said liquid from the evaporator directly to the bottom of the generator.

3. An air conditioning system comprising a blower, a refrigerating unit including a generator, a condenser, an evaporator, an absorber, conduits interconnecting said elements for flow of a refrigerating medium and an absorption solution, an additional conduit connected between the evaporator and the generator for flow of liquid refrigerant from the former to the latter, means for heating said generator, means for cooling said condenser and absorber, a control for the blower, the generator heating means and the absorber and condenser cooling means, said control being operable responsive to a change in temperature of air being conditioned, and mechanism associated with said control for continuing the operation of the generator heating means and the absorber and condenser cooling means for a short period of time after the blower has been stopped, whereby liquid refrigerant supplied to the evaporator after the blower has been stopped flows therefrom to the bottom of the generator thereby diluting solution contained therein.

4. In an air conditioning system, an absorption refrigerating apparatus comprising a generator, a condenser, an evaporator, an absorber and conduits interconnecting said elements for flow of a refrigerating medium and an absorption solution, a steam boiler for supplying steam to said generator, a gas burner for heating said boiler, means for controlling the supply of gas to said burner, means for supplying a cooling medium to said condenser and absorber, a blower for conveying air to be cooled over said evaporator, control means operable responsive to the temperature of an enclosure being cooled for stopping said blower while continuing the supply of gas to said burner and the supply of cooling medium to said condenser and absorber for a limited period of time, whereby liquid refrigerant supplied to said evaporator after the blower has been stopped flows therefrom as liquid, and means for conveying said liquid directly to the bottom of said generator.

5. An air conditioning system comprising an absorption refrigerating apparatus, said apparatus including a generator adapted to contain a refrigerant-absorbent solution, means for heating said generator to expel refrigerant vapor from solution, a condenser connected to said generator to receive refrigerant vapor therefrom, means for cooling said condenser, an evaporator connected to said condenser to receive liquid refrigerant therefrom and a conduit connecting the evaporator directly to a lower portion of the generator for flow of liquid refrigerant from the former to the latter, an air duct in which said evaporator is located, a blower for forcing air through said duct in heat exchange relation with said evaporator, and means for controlling the operation of the generator heating means, the condenser cooling means and the blower, said control means including a delayed action mechanism so constructed and arranged that the generator heating means and condenser cooling means continue to operate for a short interval of time after the blower has been stopped, whereby liquid refrigerant supplied to the evaporator after the blower has stopped flows therefrom to the lower portion of the generator thereby diluting the solution contained therein.

6. An air conditioning system comprising an absorption refrigerating apparatus, said apparatus including a generator adapted to contain a refrigerant-absorbent solution, means for heating said generator to expel refrigerant vapor from solution, a condenser connected to said generator to receive refrigerant vapor therefrom, means for cooling said condenser, an evaporator connected to said condenser to receive liquid refrigerant therefrom and a conduit connecting the evaporator directly to a lower portion of the generator for flow of liquid refrigerant from the former to the latter, an air duct in which said evaporator is located, a blower for forcing air through said duct in heat exchange relation with said evaporator, and means for controlling the operation of the generator heating means and the blower, said control means including a first thermostat for energizing and deenergizing said blower and which thermostat operates responsive to changes in the temperature of air being conditioned, and a second thermostat for energizing and deenergizing the generator heating means, said second thermostat being operable in timed relation with and responsive to the operation of the first thermostat, whereby liquid refrigerant supplied to the evaporator after the blower has been deenergized flows therefrom to the lower portion of the generator thereby diluting the solution contained therein.

7. An air conditioning system comprising an absorption refrigerating apparatus, said apparatus including a generator adapted to contain a refrigerant-absorbent solution, means for heating said generator to expel refrigerant vapor from solution, a condenser connected to said generator to receive refrigerant vapor therefrom, means for cooling said condenser, an evaporator connected to said condenser to receive liquid refrigerant therefrom and a conduit connecting the evaporator directly to a lower portion of the generator for flow of liquid refrigerant from the former to the latter, an air duct in which said evaporator is located, a blower for forcing air through said duct and over said evaporator, and means for controlling the operation of the generator heating means, the condenser cooling means and the blower, said control means including a first low voltage circuit for energizing and deenergizing said blower and which circuit is opened and closed responsive to the temperature of air being conditioned, and a second low voltage circuit for energizing and deenergizing the generator heating means and the condenser cooling means, said second low voltage circuit being opened and closed in timed relation with and responsive to the opening and closing of the first low voltage circuit, whereby liquid refrigerant supplied to the evaporator after the blower has been deenergized flows therefrom to the lower portion of the generator thereby diluting the solution contained therein.

8. In the art of conditioning air by the aid of a heat operated refrigerating system, that improvement which includes expelling refrigerant vapor from a refrigerant-absorbent solution in a place of vapor expulsion thereby concentrating the solution, liquefying the expelled refrigerant vapor, conveying the liquefied refrigerant to a place of vaporization, flowing air to be cooled in heat exchange relation with the place of vaporization whereby the liquid refrigerant is vaporized and the air is cooled, absorbing the vaporized refrigerant into the concentrated absorbent solution thereby diluting the solution, flowing the diluted solution to the place of vapor expulsion, discontinuing the flow of air in heat exchange relation with the place of vaporization while continuing to convey liquefied refrigerant thereto, flowing the liquefied refrigerant through and from the place of vaporization as liquid, and conveying said liquid to the place of vapor expulsion whereby the diluted solution contained therein is further diluted.

THOMAS K. SHERWOOD.

REFERENCES CITED

The following references are of record in the file of this patent:

UNITED STATES PATENTS

| Number | Name | Date |
|---|---|---|
| 1,981,952 | Foss | Nov. 27, 1934 |
| 2,061,606 | Zellhoefer | Nov. 24, 1936 |
| 2,352,814 | Thomas | July 4, 1944 |
| 2,392,894 | Zwickl | Jan. 15, 1946 |
| 2,399,922 | Grossman | May 7, 1946 |
| 2,469,142 | Andersson | May 3, 1949 |